(12) United States Patent
Jeong et al.

(10) Patent No.: US 10,313,875 B2
(45) Date of Patent: Jun. 4, 2019

(54) METHOD AND APPARATUS FOR CONTENT PROTECTION IN WI-FI DIRECT NETWORK

(71) Applicant: SAMSUNG ELECTRONICS CO., LTD., Suwon-si (KR)

(72) Inventors: Jin-Woo Jeong, Seoul (KR); Lochan Verma, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 15/354,113

(22) Filed: Nov. 17, 2016

(65) Prior Publication Data

US 2017/0071020 A1    Mar. 9, 2017

Related U.S. Application Data

(63) Continuation of application No. 13/997,457, filed as application No. PCT/KR2011/010067 on Dec. 23, 2011, now Pat. No. 9,504,069.

(Continued)

(51) Int. Cl.
*H04W 8/00* (2009.01)
*H04W 8/22* (2009.01)
(Continued)

(52) U.S. Cl.
CPC ............ *H04W 8/22* (2013.01); *H04L 63/205* (2013.01); *H04W 8/005* (2013.01); *H04W 12/08* (2013.01);
(Continued)

(58) Field of Classification Search
CPC ... H04W 76/023; H04W 76/14; H04W 8/005; H04W 8/22; H04W 12/08; H04W 84/12; H04L 63/205; G11B 20/00188
See application file for complete search history.

(56) References Cited

U.S. PATENT DOCUMENTS 8,099,609 B2    1/2012    Takezaki
8,170,481 B2 *  5/2012    Rangarajan ............ H04L 67/16
                                                   370/349

(Continued)

FOREIGN PATENT DOCUMENTS

CN    1725353 A       1/2006
CN    101341686 A     1/2009

(Continued)

OTHER PUBLICATIONS

Communication dated Jun. 13, 2017 by the State Intellectual Property Office of P.R. China in counterpart Chinese Patent Application No. 201180062465.4.

(Continued)

*Primary Examiner* — Chandrahas B Patel
(74) *Attorney, Agent, or Firm* — Sughrue Mion, PLLC

(57) ABSTRACT

A method of performing communication between a first device and a second device by using a Wi-Fi direct scheme is provided. The method may include receiving, by the first device, information on relating to a content protection capability of the second device in during a device discovery procedure; and determining, by the first device, whether to perform a connection setup procedure with the second device based on the received information on relating to the content protection capability of the second device.

17 Claims, 6 Drawing Sheets

| Bits | Interpretation |
|---|---|
| 0~1 | 0b00: WFD source<br>0b01: WFD primary sink<br>0b10: WFD secondary sink<br>0b11: WFD source/primary sink |
| 2 | 0b0: secondary sink operation not supported<br>0b1: secondary sink operation supported |
| 3~4 | 0b00: Not-paired/Available for pairing<br>0b01: Paired & Idle<br>0b10: Active<br>0b11: Set by WFD source devices; Set by WFD sink devices not supporting secondary sink operation. |
| 5 | 0b0: WFD Service Discovery (WSD): Not supported<br>0b1: WFD Service Discovery (WSD): supported |
| 6 | 0b0: Preferred Connectivity (PC): P2P<br>0b1: Preferred Connectivity (PC): TDLS |
| 7 | Content Protection |
| 8~15 | Reserved |

Related U.S. Application Data

(60) Provisional application No. 61/427,156, filed on Dec. 24, 2010.

(51) Int. Cl.

| | | |
|---|---|---|
| *H04L 29/06* | (2006.01) | |
| *H04W 12/08* | (2009.01) | |
| *H04W 76/14* | (2018.01) | |
| *G11B 20/00* | (2006.01) | |
| *H04W 84/12* | (2009.01) | |

(52) U.S. Cl.
CPC ....... *H04W 76/14* (2018.02); *G11B 20/00188* (2013.01); *H04W 84/12* (2013.01)

(56) References Cited

U.S. PATENT DOCUMENTS

| | | |
|---|---|---|
| 8,554,132 B2 | 10/2013 | Cho et al. |
| 8,559,350 B2 | 10/2013 | Kuehnel et al. |
| 8,800,059 B2 | 8/2014 | Carr |
| 8,949,926 B2 | 2/2015 | Chung et al. |
| 9,215,748 B2 | 12/2015 | Otsuka |
| 2004/0205246 A1 | 10/2004 | Park |
| 2005/0078644 A1 | 4/2005 | Tsai et al. |
| 2006/0020794 A1 | 1/2006 | Oh |
| 2006/0265333 A1 | 11/2006 | Gomes et al. |
| 2008/0031209 A1 | 2/2008 | Abhishek et al. |
| 2008/0134237 A1 | 6/2008 | Tu et al. |
| 2009/0287940 A1 | 11/2009 | Carr |
| 2009/0327544 A1 | 12/2009 | Cho et al. |
| 2010/0166017 A1 | 7/2010 | Na et al. |
| 2010/0216391 A1 | 8/2010 | Cho et al. |
| 2010/0322213 A1 | 12/2010 | Liu et al. |
| 2011/0170573 A1 | 7/2011 | Kim et al. |
| 2013/0182597 A1 | 7/2013 | Chiang |
| 2015/0063213 A1 | 3/2015 | Laroia et al. |

FOREIGN PATENT DOCUMENTS

| | | | |
|---|---|---|---|
| CN | 101682927 A | | 3/2010 |
| JP | 2003-264870 A | | 9/2003 |
| JP | 2007-102782 A | | 4/2007 |
| JP | 2007-150712 A | | 6/2007 |
| JP | 2007-195110 A | | 8/2007 |
| JP | 2008-219358 A | | 9/2008 |
| JP | 2009-527136 A | | 7/2009 |
| JP | 2009-545936 A | | 12/2009 |
| JP | 2010-526507 A | | 7/2010 |
| JP | 2010-200305 A | | 9/2010 |
| KR | 10-2009-0068344 A | | 6/2009 |
| KR | 10-2010-0033929 A | | 3/2010 |
| WO | 2010/086699 A1 | | 8/2010 |

OTHER PUBLICATIONS

Communication dated Nov. 1, 2017, issued by the Canadian Intellectual Property Office in counterpart Canadian Patent Application No. 2,822,802.
Office Action issued in parent U.S. Appl. No. 13/997,457 dated Apr. 10, 2015.
Office Action issued in parent U.S. Appl. No. 13/997,457 dated Oct. 1, 2015.
Notice of Allowance issued in parent U.S. Appl. No. 13/997,457 dated Jul. 20, 2016.
Written Opinion (PCT/ISA/237) dated Jul. 30, 2012, issued in the International Application No. PCT/KR2011/010067.
"High-Bandwidth Digital Content Protection System: Mapping HDCP to WHDI", Digital Content Protection LLC, Oct. 2008, http://www.digital-cp.com/files/static_page_files/301E6C94-AEDA-E99A-A3D3A40D8970B110/HDCP%20on%20WHDI%20Specification%20Rev2_0%20_2_.pdf, 57 pages total.
"Wi-Fi Certified Wi-Fi Direct", Wi-Fi Alliance, Oct. 2010, 14 pages total.
"Wi-Fi Direct", Hugues Systique, White Paper, 2006, http://hsc.com/Portals/0/Uploads/Articles/WFD_Technology_Whitepaper_v_1.7635035318321315728.pdf, 19 pages total.
Andreaux, et al.; "Copy Protection System for Digital Home Networks", IEEE Signal Processing Magazing, vol. 21, No. 2, Mar. 2004, 9 pages total.
Communication dated Dec. 11, 2015, issued by the State Intellectual Property Office of the People's Republic of China in counterpart Chinese Application No. 201180062465.4.
Communication dated Nov. 24, 2015, issued by the Japanese Patent Office in counterpart Japanese Application No. 2013-546040.
Communication dated Nov. 30, 2015, issued by the European Patent Office in counterpart European Application No. 11851251.6.
Communication dated Jul. 22, 2016, issued by the State Intellectual Property Office of the People's Republic of China in counterpart Chinese Patent Application No. 201180062465.4.
Communication dated Jun. 21, 2016, issued by the Japanese Intellectual Property Office in counterpart Japanese Patent Application No. 2013-546040.
International Search Report (PCT/ISA/210) dated Jul. 30, 2012, issued in the International Application No. PCT/KR2011/010067.
Montemurro, et al.; "IEEE P802.11 Wireless LANs TDLS Peer Discovery", Research in Motion, Jan. 2010, Doc.: IEEE 802.11-09-1218r7, 13 pages total.
Communication dated Jan. 16, 2017, issued by the State Intellectual Property Office of the People's Republic of China in counterpart Chinese Patent Application No. 201180062465.4.

* cited by examiner

| Field | Size (octets) | Value (Hexadecimal) |
|---|---|---|
| Element ID | 1 | DD |
| Length | 1 | Variable |
| OUI | 3 | 00 50 F2 |
| OUI Type | 1 | |
| WFD Subelements | Variable | |

FIG. 6

| Field | Size (octets) | Value (Hexadecimal) |
|---|---|---|
| Subelements ID | 1 | Variable |
| Length | 1 | Variable |
| Subelements body field | Variable | |

FIG. 7

| Subelements ID | Notes |
|---|---|
| 0 | Status |
| 1 | WFD Device Information |
| 2 | Associated BSSID |
| 3 | Coupled Sink Information |
| 4 | Display EDID |
| 5 | H.264 codec |
| 6 | LPCM Codec |
| 7 | AAC Codec |
| 8 | Dolby Digital Codec |
| 9 | DTS Codec |
| 10 | Transport Capability |
| 11 | 3D Video Capability |
| 12 | Local IP Address |
| 13 | Control Signaling Capabilities |
| 14-255 | Reserved |

FIG. 8

| Field | Size (octets) | Value |
|---|---|---|
| Subelements ID | 1 | 1 |
| Length | 1 | 3 |
| WFD Device Information | 1 | |
| WFD Device Maximum Throughput | 2 | |

FIG. 9

| Bits | Interpretation |
|---|---|
| 0~1 | 0b00: WFD source<br>0b01: WFD primary sink<br>0b10: WFD secondary sink<br>0b11: WFD source/primary sink |
| 2 | 0b0: secondary sink operation not supported<br>0b1: secondary sink operation supported |
| 3~4 | 0b00: Not-paired/Available for pairing<br>0b01: Paired & Idle<br>0b10: Active<br>0b11: Set by WFD source devices; Set by WFD sink devices not supporting secondary sink operation. |
| 5 | 0b0: WFD Service Discovery (WSD): Not supported<br>0b1: WFD Service Discovery (WSD): supported |
| 6 | 0b0: Preferred Connectivity (PC): P2P<br>0b1: Preferred Connectivity (PC): TDLS |
| 7 | Content Protection |
| 8~15 | Reserved |

METHOD AND APPARATUS FOR CONTENT PROTECTION IN WI-FI DIRECT NETWORK

CROSS-REFERENCE TO RELATED APPLICATIONS

This is a continuation of application Ser. No. 13/997,457 filed Jun. 24, 2013, which is a National Stage of International Application No. PCT/KR2011/010067 filed Dec. 23, 2011, and claims priority from U.S. Provisional Application No. 61/427,156 filed Dec. 24, 2010, the disclosures of which are incorporated herein in their entirety by reference.

BACKGROUND

1. Field

Apparatuses and methods in accordance with exemplary embodiments relate to a method and device for protecting content in a Wi-Fi direct communication scheme.

2. Description of the Related Art

A Wi-Fi direct communication scheme uses a network arrangement of participating devices where connection is by a peer-to peer scheme between the devices. When using the Wi-Fi direct communication scheme, the Wi-Fi devices do not necessitate connection to, the use of, or participation in a home network, an office network, or a hot spot network. That is, a Wi-Fi direct communication scheme provides direct connection between two devices without the need for any form of an additional individual router, hub, gate, etc. outside the two connecting devices in order to facilitate transmissions.

FIG. 1 illustrates a related art Wi-Fi direct communication scheme.

In FIG. 1, a digital versatile disk (DVD) player 101 uses the Wi-Fi direct communication scheme to transmit content 104 such as music, photos, and moving images to a display devices, for example, to a television (TV) TV1 102 or a TV2 103 which is a display device.

The DVD player 101 may be another device that stores a content, such as Blue-ray player, an MP3 player, a personal computer, personal digital assistant, a mobile device, and a simple storage medium.

The TV1 102 or the TV2 103 may be another device that displays content to a user, such as a monitor and a speaker.

The content 104 may be an original work of authorship such as music, a photo, and a moving image that may be content protected by a copyright.

The Wi-Fi direct (P2P) scheme is not a standard that has been suggested in consideration of a display device. Rather the Wi-Fi direct scheme is a standard that has been suggested on the basis of connectivity between devices. Accordingly, the Wi-Fi direct scheme does not recognize whether a device supports content protection before setting connection between devices.

For example, in the Wi-Fi direct scheme, it is not possible for the DVD player 101 to recognize whether each TV supports content protection before setting up a connection with the TV1 102 and the TV2 103 as depicted in FIG. 1. According to one exemplary embodiment, TV1 102 may be a device that does not supports content protection, while TV2 103 may be a device that does supports content protection. In such an embodiment, if the DVD player 101 connects to the TV1 102 through the Wi-Fi direct scheme and sends the content 104 protected by the copyright to TV1 102 with the instructions for the content to be displayed, a message indicating that the content cannot be replayed on TV1 102 will instead be displayed due to the lack of support for the specific content protection. Thus, when the user desires to replay the content 104 through the DVD player 101, the user may be inconvenienced due to the lost time and energy exerted in the attempt to connect and display the content on TV1 and then the additional wait for the connection between the DVD player 101 and the TV2 103 to occur and then replay the content.

It is also worth noting that even though the TV1 102 does not support content protection and thus cannot replay the content 104, power and time is still consumed when connecting with the DVD player 101.

SUMMARY

One or more exemplary embodiments provide a method for receiving information relating to whether a device supports content protection during a device discovery procedure of searching for a surrounding device when performing communication between display devices according to a Wi-Fi direct scheme in order to provide a communication scheme for performing an efficient Wi-Fi direct communication scheme between display devices.

According to an aspect of an exemplary embodiment, there is provided a method of performing communication between a first device and a second device by using a Wi-Fi direct scheme, the method including: receiving information relating to a content protection capability of the second device during a device discovery procedure; and determining whether to perform a connection setup procedure with the second device based on the received information relating to the content protection capability.

The receiving of the information relating to the content protection capability of the second device may include receiving a probe response message including the information relating to the content protection capability.

The method may further include: transmitting information relating to a content protection capability of the first device to the second device, wherein the information the content protection capability of the second device is received in response to the transmitted information relating to the content protection capability of the first device.

The transmitting of the information relating to the content protection capability of the first device may include transmitting a probe request message including the information relating to the content protection capability.

The information relating to the content protection capability may be included in a Wi-Fi Display Information Element (WFD IE).

The information relating to the content protection capability may be included in a Wi-Fi Display (WFD) Device Information Field within the WFD IE.

The information relating to the content protection capability may indicate whether a high-definition content protection 2.0 (HDCP 2.0) is supported.

According to an aspect of another exemplary embodiment, there is provided a device for performing communication using a Wi-Fi direct scheme, including: a receiver configured to receive information relating to a content protection capability of a second device in a device discovery procedure; and a determination processor configured to determine whether to perform a connection setup procedure with the second device based on the received information relating to the content protection capability.

The receiver may be configured to receive a probe response message including the information relating to the content protection capability.

The device may further include: a transmitter configured to transmit information relating to a content protection capability of the device to the second device, wherein the information relating to the content protection capability of the second device is received in response to the transmitted information relating to the content protection capability of the device.

The transmitter may transmit a probe request message including the information relating to the content protection capability.

The information relating to the content protection capability may be included in a Wi-Fi Display Information Element (WFD IE).

The information relating to the content protection capability may be included in a Wi-Fi Display (WFD) Device Information Field within the WFD IE.

The information relating to the content protection capability may indicate whether a high-definition content protection 2.0 (HDCP 2.0) is supported.

BRIEF DESCRIPTION OF THE DRAWINGS

The above and other aspects will become more apparent by describing in detail exemplary embodiments with reference to the attached drawings in which:

FIG. 6 is a table illustrating a general format of a WFD subelement according to an exemplary embodiment;

FIG. 7 is a table illustrating a WFD subelement ID according to an exemplary embodiment;

FIG. 8 is a table illustrating a WFD device information subelement according to an exemplary embodiment;

FIG. 9 is a table illustrating a WFD device information field according to an exemplary embodiment.

DETAILED DESCRIPTION

Figure 1:
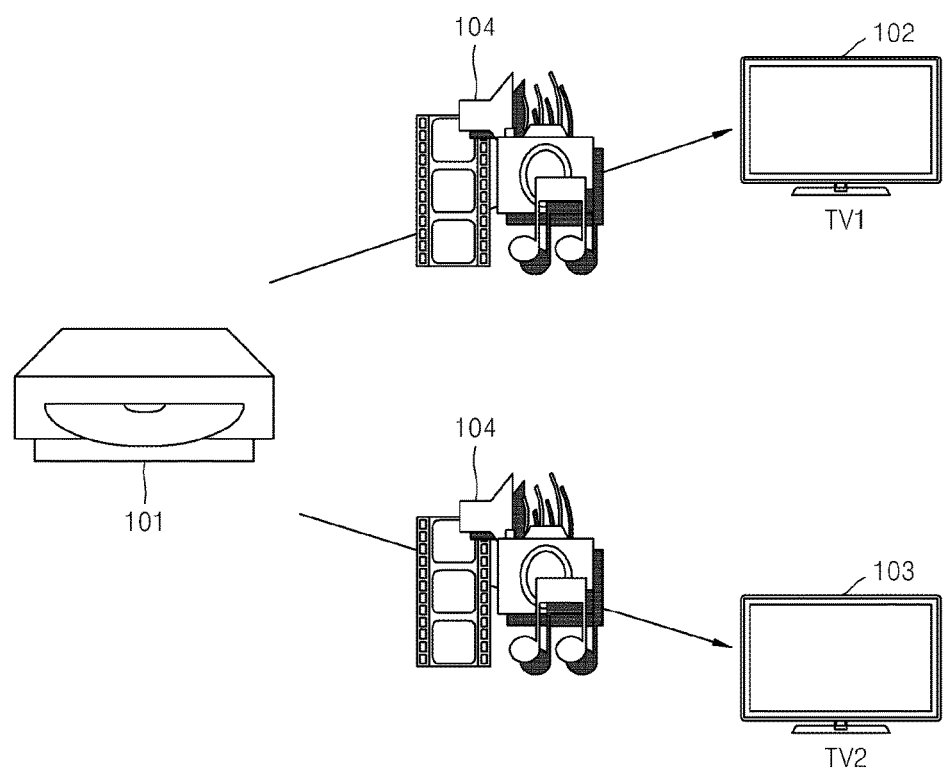
FIG. 1 is a diagram illustrating a related art Wi-Fi direct communication scheme.

One or more exemplary embodiments will now be described more fully with reference to the accompanying drawings, in which exemplary embodiments are shown. Like reference numerals in the drawings denote like elements, and thus their description will be omitted. The size of each component of drawings may be exaggerated for clarity of description.

Figure 2:
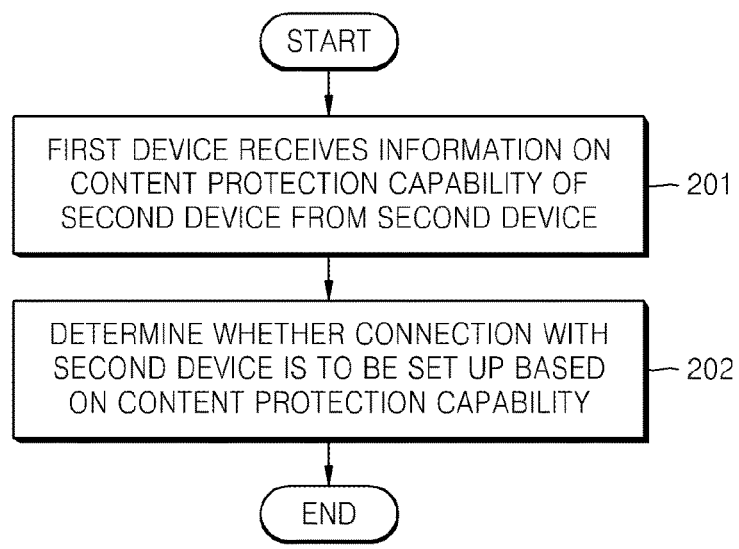
FIG. 2 is a flowchart illustrating a device discovery procedure of a first device according to an exemplary embodiment.

FIG. 2 is a flowchart illustrating a device discovery procedure of a first device according to an exemplary embodiment.

The device discovery procedure is a procedure for not only finding a surrounding device for communication, but is also a procedure that includes searching for a device that supports a Wi-Fi direct scheme among devices existing around another device in order for the two devices to connect. Further, when there is a device that supports a Wi-Fi direct scheme, information on each device may be received.

However, the related art Wi-Fi direct (P2P) scheme is not a standard that has been suggested for consideration with use of a display device, because of the lack of any procedure for appropriately protecting content in the device discovery procedure.

Thus, in accordance with an exemplary embodiment, in operation 201, a first device receives information regarding the content protection capability of a second device from the second device during the device discovery procedure.

The information relating to the content protection capability is information about whether the device supports content protection.

The information relating to the content protection capability of the second device received from the second device may be included in a probe response message. The probe response message is a message containing receiving device information as required by the device discovery procedure of the Wi-Fi direct communication scheme.

Further, in accordance with an exemplary embodiment, the information relating to the content protection capability may be included in the Wi-Fi display information element (WFD IE). The WFD IE will be described later in detail with reference to FIG. 5.

Furthermore, the information relating to the content protection capability may be included in the WFD information field within the WFD IE. The WFD information field will be described later in detail with reference to FIG. 8.

According to an exemplary embodiment, the information relating to the content protection capability may be information indicating whether the second device supports high definition content protection 2.0 (High-bandwidth Digital Content Protection HDCP 2.0).

The HDCP is a copyright protection technology for encrypting a path through which digital signals are transmitted and received from a moving image replay device to a display device. HDCP prevents any unauthorized copying of content, and accordingly is a standard designed to protect the integrity of digital content.

In operation 202, it is determined whether the first device may perform a connection setup procedure with the second device based on information relating to the content protection capability of the second device received in operation 201.

That is, the first device determines whether the second device supports content protection by the information received from the second device, and determines whether to perform a connection setup procedure with the second device.

Various methods may be used to determine whether to perform the connection setup procedure. For example, when there are a plurality of devices that support a Wi-Fi direct communication scheme, information on whether to perform a connection setup with another device may be determined by and received from the user after the user is provided compatible devices that may be done by displaying the plurality of devices that support content protection on the first device.

According to another exemplary embodiment, a connection setup may be set to be automatically performed according to a priority that is set in the first device.

Further, if there is only one device that supports the Wi-Fi direct communication scheme, the device may be set to display whether the device supports content protection before performing the connection setup.

Figure 3:
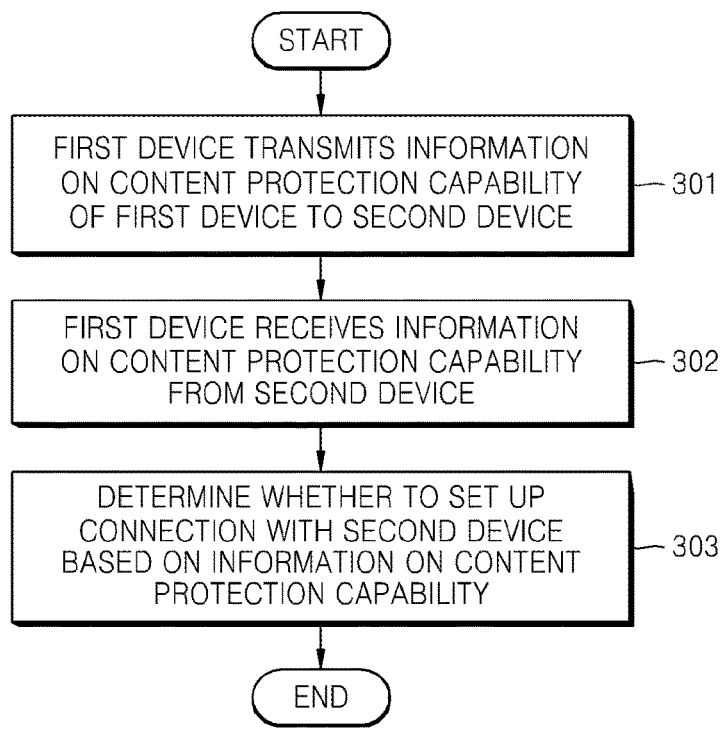
FIG. 3 is a flowchart illustrating a device discovery procedure of a first device according to another exemplary embodiment.

FIG. 3 is a flowchart illustrating a device discovery procedure of a first device according to another exemplary embodiment.

In the Wi-Fi direct scheme, the device that is determined to be the device that operates as an access point (AP), or the device that operates as a station, may be determined after the connection setup procedure. Thus, the role of each device may not be determined during the device discover procedure. Accordingly, the second device may need the information of the first device after the connection setup procedure, and therefore the second device receives the information of the first device.

In operation 301, the first device transmits information relating to the content protection capability of the first device to the second device.

The information relating to the content protection capability transmitted by the first device to the second device may be included in a probe request message.

The probe request message is a message containing transmitting device information in the device discovery procedure of the Wi-Fi direct communication scheme.

The information relating to the content protection capability may be included in WFD IE.

The information relating to the content protection capability may be included in the WFD device information field within the WFD IE.

The information relating to the content protection capability may be information indicating whether HDCP 2.0 is supported.

In operation 302, the first device receives information relating to the content protection capability from the second device.

In operation 303, the first device determines whether to set up connection with the second device based on the information relating to the content protection capability of the second device. The connection setup may be performed in various schemes as was described with reference to FIG. 2.

Further, the second device may also determine whether to set up connection with the first device based on the information relating to the content protection capability received from the first device. The connection set up may be determined based on a combination of both the first and second devices' information on their content protection capability.

Figures 4, 5:
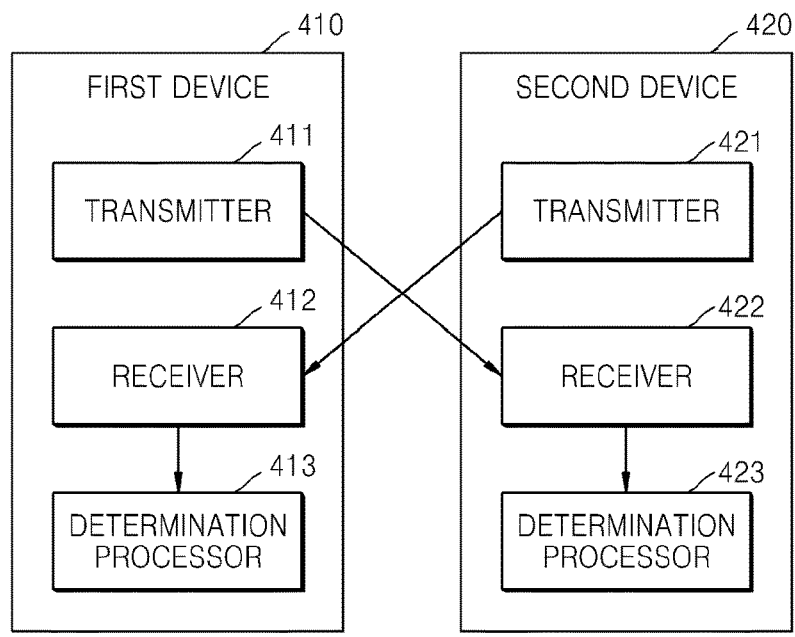
FIG. 4 is a block diagram illustrating a structure of a first device and a second device according to an exemplary embodiment.
FIG. 5 is a table illustrating a Wi-Fi display (WFD) information element (IE) according to an exemplary embodiment.

FIG. 4 is a block diagram illustrating a structure of a first device and a second device according to an exemplary embodiment.

The transmitter 411 of the first device 410 transmits information relating to the content protection capability of the first device to the second device. As illustrated in FIG. 3, the information related to the content protection capability of the first device 410 may be included in the probe request message, WFD IE, and more specifically, it may be included in the WFD device information field of the WFD IE.

A receiver 412 of the first device 410 receives information related with the content protection capability of the second device 420 from the second device.

The determination processor 413 of the first device 410 determines whether to perform a connection setup procedure with the second device 420 based on the information related with the content protection capability of the second device which has been received by the receiver of the first device 410 from the transmitter 421 of the second device 420.

The transmitter of the second device 420 transmits the information related with the content protection capability of the second device 420 to the first device 410.

The receiver 422 of the second device 420 receives information related with the content protection capability of the first device 410 from the transmitter 411 of the first device 410.

A determination processor 423 of the second device determines whether to perform a connection setup procedure with the first device 410 based on information related with the content protection capability of the first device 410 received from the transmitter 411 of the first device 410.

FIG. 5 is a table illustrating a Wi-Fi display (WFD) information element (IE) according to an exemplary embodiment.

Here, WFD is a communication scheme, and refers to a scheme where communication is performed between display devices based on Wi-Fi direct standard.

WFD IE represents a format of a frame that receives basic information such as a device type and state. The probe request frame or probe response frame is also written according to the format of the WFD IE.

In the illustrated example, WFD IE includes Element ID, Length, OUI, OUI Type, and WFD Subelements. Respective sizes of Element ID, Length, OUI, and OUI TYPE fields are 1, 1, 3 and 1 octets, where an octet consists of eight bits, and the size of WFD Subelements is a variable number of bits.

Element ID field is a field that is used when a vendor desires to make functions that are not defined in IEEE 802.11 standard, and Length field denotes the entire length of WFD IE. For example, as discussed below, FIG. 7 illustrates of different identifiers this field could be set to in order to reference the noted element which may be outside the defined IEEE 802.11 standard.

OUI field is an abbreviation of Organization Unique Identifier and represents a unique identifier defined to distinguish each vendor, and OUI Type field represents the version of WFD IE.

The content written in the WFD IE may not be sufficient for the WFD Subelement field, and thus the points indicating detailed device information are included in the WFD Subelement field. The points included in the WFD Subelement field will be described in detail with reference to FIG. 6.

Some of the WFD IE fields of one or more exemplary embodiments may be omitted.

FIG. 6 is a table illustrating a general format of a WFD Subelement according to an exemplary embodiment.

Here, in FIG. 6, the WFD Subelement includes Subelement ID, Length, and Subelements body fields. Sizes of Subelement ID and Length fields are respectively 1 octet, and the size of the Subelement body field is variable.

The Subelement ID of an exemplary embodiment represents a type of the WFD Subelement, which will be described later in detail with reference to FIG. 7.

The Length field of an exemplary embodiment represents the entire length of the WFD Subelement.

The Subelements body field of an exemplary embodiment shows specific points of the Subelement.

Some of the WFD Subelements may be omitted.

FIG. 7 is a table illustrating a WFD subelement ID according to an exemplary embodiment.

The WFD subelement ID may be set to identify the variable length body as WFD Device Information of an exemplary embodiment which refers to information on WFD device. In one or more exemplary embodiments, the content protection capability of a device intended to be acquired before setting up connection is written on the WFD Subelement of the WFD Device Information type, which will be described in detail with reference to FIG. 8.

Status of an exemplary embodiment represents status information of the device.

Associated Basic Service Set Identifier (BSSID) of an exemplary embodiment represents an identifier that identifies a basic service area in 802.11.

Display Extended Display Identification Data (EDID) of an exemplary embodiment represents a type of data for transmitting display information of a device.

Coupled Sink Information of an exemplary embodiment represents connection with another device.

H.264 Codec, LPCM Codec, AAC Codec, Dolby Digital Codec, and DTS Codec of an exemplary embodiment show information related to Codec. Each Codec is a well-known standard in the art and thus detailed description on each Codec is omitted here.

Transport Capability, 3D Video Capability, Local IP Address, and Control Signaling Capabilities of an exemplary embodiment show the capability and address of the device, and the detailed description thereof is omitted here.

Furthermore, the information related with content protection capability may be included in the Subelement ID by adding Content Protection Capability.

Some of Subelement IDs may be omitted.

FIG. 8 is a table illustrating information that may be included in a WFD device information Subelement according to an exemplary embodiment.

In accordance with one or more exemplary embodiments, when the Subelement ID field is one (1) as noted in FIG. 7, the Subelement about WFD Device Information is included. Here, the content related with device information is displayed in WFD device information in a bitmap format. The details are described with reference to FIG. 8.

WFD Device Maximum Throughput shows the maximum average throughput of the device.

FIG. 9 is a table illustrating different possible values that could be found in a WFD device information field according to an exemplary embodiment.

WFD device information field may be disclosed in a bitmap form.

First and second bits of WFD device information field (bits 0 and 1) of an exemplary embodiment indicate a WFD source, a WFD sink, a primary sink device or a secondary sink device.

A third bit of WFD device information field (bit 2) of an exemplary embodiment indicates whether a secondary sink operation is supported.

Fourth and fifth bits of WFD device information field (bits 3 and 4) of an exemplary embodiment indicate a paring state of the current device and whether paring is possible.

A sixth bit of WFD device information field (bit 5) of an exemplary embodiment indicates whether a WFD service discovery procedure is supported.

A seventh bit of WFD device information field (bit 6) of an exemplary embodiment indicates a connection scheme of the device. That is, the seventh bit indicates whether the device supports a Wi-Fi direct scheme, i.e., P2P scheme, or a tunneled direct link setup (TDLS) scheme. The TDLS scheme is not the Wi-Fi direct scheme, and is a scheme of wireless communication where communication is performed through an AP.

An eighth bit of WFD device information field (bit 7) of an exemplary embodiment indicates information on content protection capability of the device. As illustrated in FIG. 7, the content protection capability may be defined in the Subelement ID and the points that display the content protection capability may be added, and as illustrated in FIG. 9, information related to the content protection capability of the device may be indicated within the device information Subelement.

The content protection capability of an exemplary embodiment may be information indicating whether HDCP 2.0 is supported.

Figure 10:
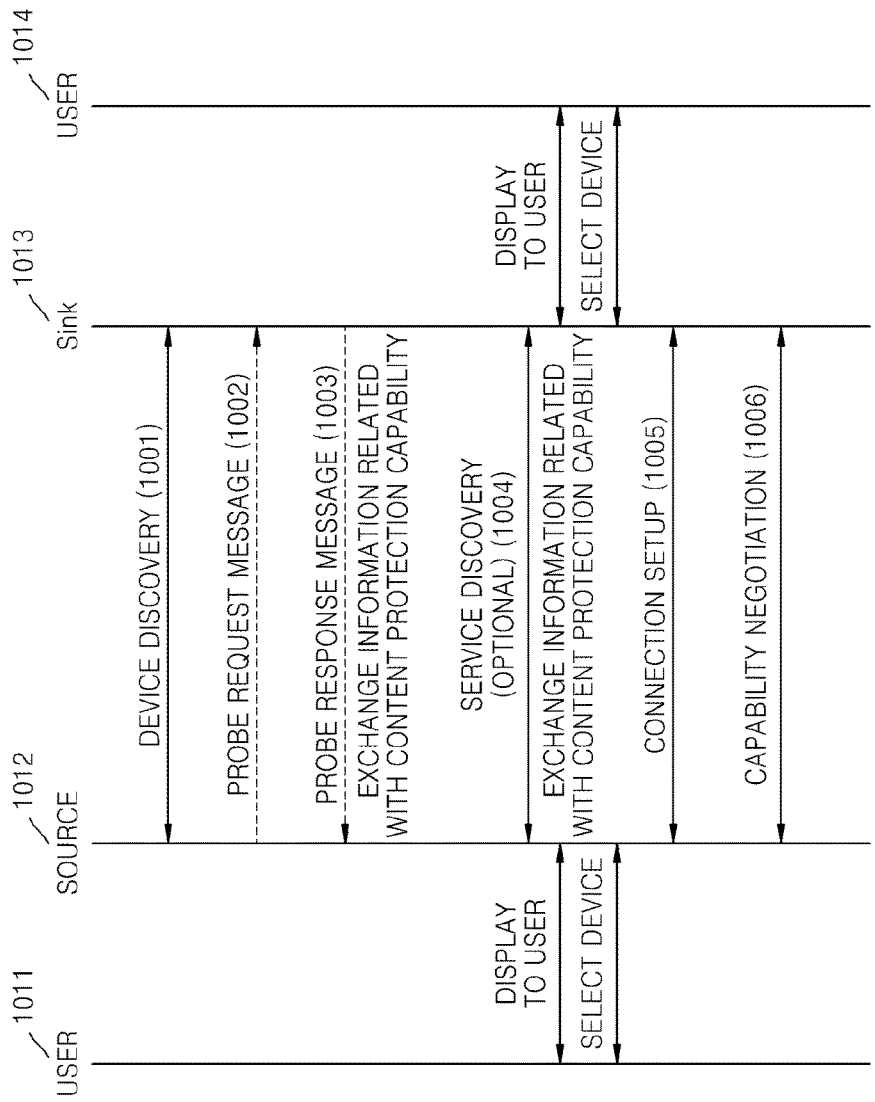
FIG. 10 is a signal flowchart of a WFD communication according to an exemplary embodiment.

FIG. 10 is a signal flowchart of a WFD communication according to an exemplary embodiment.

A probe request message 1002 and a probe response message 1003 are exchanged during a device discovery procedure 1001 between a source device 1012 and a sink device 1013. Information related to the content protection capability of the device may be included in the probe request message 1002 and the probe response message 1003, and thus information related to the content protection capability may be exchanged between the source device 1012 and the sink device 1013.

In accordance with one or more exemplary embodiments, the service discovery procedure 1004 is optional, and whether the procedure is to be performed is determined according to whether the device supports the content protection capability as described with reference to FIG. 9. When the service discovery procedure 1004 is performed, the information related with the content protection capability may be exchanged at the service discovery procedure 1004.

The information related with the content protection capability of the device is exchanged before the connection setup procedure 1005, and information related with the content protection capability of the devices is displayed to users 1011 and 1014 of respective devices. The user may select the device with which a connection setup procedure is to be performed based on information related with the content protection performance of the displayed device.

After the information related with the content protection capability is exchanged, the connection setup procedure 1005 is performed with the device selected by the user's input, and thereafter a capability negotiation procedure 1006 is performed. In the capability negotiation procedure 1006, the device that is to play a role of an access point (AP) and a station is determined as in a general Wi-Fi direct scheme. Furthermore, information related with the content protection capability may be set to be exchanged in the capability negotiation procedure.

One or more exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

While exemplary embodiments have been shown and described with reference to exemplary embodiments thereof, it will be understood by those of ordinary skill in the art that various changes in form and details may be made therein without departing from the spirit and scope of the inventive concept as defined by the following claims.

What is claimed is:

1. A method of performing communication between a first device and a second device by using a peer to peer (P2P) scheme, the method comprising:

transmitting, by the first device, a probe request message, for a device discovery procedure;

receiving, by the first device, a probe response message comprising content protection capability information of the second device in response to the probe request message;

performing a connection setup procedure with the second device based on the probe response message comprising the content protection capability information of the second device; and performing a capability negotiation procedure with the second device by receiving the content protection capability information of the second device, after the connection setup procedure, wherein the probe request message comprises content protection capability information of the first device and information relating to a device type of the first device, and the information relating to the device type of the first device indicates whether a role of a source device or a role of a sink device is supported.

2. The method of claim 1, further comprising determining whether to perform the connection setup procedure with the second device based on a user input, wherein the content protection capability information of the first device is used by the second device, to determine whether to perform the connection setup procedure by the second device.

3. The method of claim 2, further comprising:

receiving, by the first device, information regarding a decision whether to perform the connection setup procedure from the second device; and transmitting, by the first device, information regarding the decision whether to perform the connection setup procedure to the second device.

4. A non-transitory computer-readable recording medium having recorded a program for implementing a method disclosed in claim 1.

5. The method of claim 1, wherein the content protection capability information and information relating to the device type are included in a Wi-Fi Display Information Element (WFD IE).

6. The method of claim 5, wherein the content protection capability information is included in a Wi-Fi Display subelement within the WFD IE and the Wi-Fi Display subelement further comprises one from among status information of the device, Basic Service Set Identifier (BSSID) information relating to identifying a basic service set, Display Extended Display Identification Data (EDID) information indicating a type of data for transmitting and Coupled sink information indicating connection with another device.

7. The method of claim 5, wherein the WFD IE further includes a device information field, the device information field comprising one from among information indicating whether a secondary sink operation is supported, information indicating a paring state, information whether a WFD service discovery procedure is supported, and information indicating a connection scheme.

8. The method of claim 1, wherein the peer to peer scheme is a Wi-Fi direct scheme.

9. The method of claim 1, wherein the information relating to the device type of the first device indicates whether a role of source device or a role of sink device is supported.

10. A first device for performing communication using a peer to peer (P2P) scheme with a second device, the first device comprising:

a transmitter configured to transmit a probe request message, for a device discovery procedure;

a receiver configured to receive a probe response message comprising content protection capability information of the second device in response to the probe request message; and a processor configured to perform a connection setup procedure with the second device based on the probe response message comprising the content protection capability information of the second device, and perform a capability negotiation procedure with the second device, wherein the probe request message comprises a content protection capability information of the first device and information relating to a device type of the first device, and the information relating to the device type of the first device indicates whether a role of a source device or a role of a sink device is supported, wherein the receiver is further configured to receive the content protection capability information of the second device in the capability negotiation procedure, after the connection setup procedure.

11. The first device of claim 10, wherein the peer to peer scheme is a Wi-Fi direct scheme.

12. The first device of claim 10, the content protection capability information and the information relating to the device type are included in a Wi-Fi Display Information Element (WFD IE).

13. The first device of claim 12, wherein the content protection capability information is included in a Wi-Fi Display subelement within the WFD IE and the Wi-Fi Display subelement further comprises one from among status information of the device, Basic Service Set Identifier (BSSID) information relating to identifying a basic service set, Display Extended Display Identification Data (EDID) information indicating a type of data for transmitting and Coupled sink information indicating connection with another device.

14. The first device of claim 12, wherein the WFD IE further includes a device information field, the device information field comprising one from among information indicating whether a secondary sink operation is supported, information indicating a paring state, information whether a WFD service discovery procedure is supported, and information indicating a connection scheme.

15. The first device of claim 10, wherein the processor is further configured to determine whether to perform the connection setup procedure with the second device based on a user input, and the content protection capability information of the first device is used by the second device, to determine whether to perform the connection setup procedure by the second device.

16. The first device of claim 15, wherein the receiver is further configured to receive information regarding a decision whether to perform the connection setup procedure from the second device, and the transmitter is further configured to transmit information regarding the decision whether to perform the connection setup procedure to the second device.

17. The first device of claim 10, wherein the information relating to the device type of the first device indicates whether a role of source device or a role of sink device is supported.

* * * * *